United States Patent [19]

Heitmann et al.

[11] 4,038,815
[45] Aug. 2, 1977

[54] GAS TURBINE

[75] Inventors: Arnold M. Heitmann, Swampscott; Walter L. Brassert, Belmont; Donald B. Chouinard, Peabody, all of Mass.

[73] Assignee: Northern Research and Engineering Corporation, Cambridge, Mass.

[21] Appl. No.: 583,793

[22] Filed: June 4, 1975

Related U.S. Application Data

[63] Continuation of Ser. No. 346,651, March 30, 1973, abandoned.

[51] Int. Cl.² .......... F02C 3/10; F02C 7/06; F02C 7/22
[52] U.S. Cl. .......... 60/39.08; 60/39.16 R; 60/39.36; 60/39.74 S
[58] Field of Search .......... 60/39.31, 39.32, 39.36, 60/39.37, 39.74 S, 39.16 R, 39.08, 39.75, 39.16 S; 415/214

[56] References Cited

U.S. PATENT DOCUMENTS

| 2,341,664 | 2/1944 | Schutte | 415/214 |
|---|---|---|---|
| 2,416,389 | 2/1947 | Heppnen | 60/39.74 S |
| 2,784,551 | 3/1957 | Kanlby | 60/39.08 |
| 2,809,493 | 10/1957 | Paulecka | 60/39.36 |
| 2,856,755 | 10/1958 | Szydlowski | 60/39.74 S |
| 3,088,278 | 5/1963 | Franz | 60/39.31 |
| 3,102,393 | 9/1963 | Clare | 60/39.74 S |
| 3,133,416 | 5/1964 | Mock | 60/39.16 S |
| 3,269,119 | 8/1966 | Price | 60/39.36 |
| 3,381,471 | 5/1968 | Szydlowski | 60/39.36 |
| 3,481,145 | 12/1969 | Oldfield | 60/39.16 S |
| 3,635,577 | 1/1972 | Dee | 415/214 |

FOREIGN PATENT DOCUMENTS

| 1,114,676 | 10/1961 | Germany | 60/39.74 S |

Primary Examiner—Carlton R. Croyle
Assistant Examiner—L. J. Casaregola

[57] ABSTRACT

A gas turbine includes a rotatable unit having a compression component and an expansion component, and a toroidal combustion chamber between the compression and expansion components. The gas turbine has a gas flow path serially through the compression component, the combustion chamber and the expansion component. A first bearing assembly is positioned on the side of the compression component remote from the combustion chamber and a second bearing assembly is positioned on the side of the expansion component remote from the combustion chamber so that the rotatable unit is unsupported between the compression and expansion components and no bearing structures are in the vicinity of the combustion chamber.

25 Claims, 14 Drawing Figures

GAS TURBINE

This application is a continuation of Serial No. 346,651, filed Mar. 30, 1973, entitled "Gas Turbine," now abandoned.

SUMMARY OF THE INVENTION

This invention relates to engines and more particularly to gas turbine.

The gas turbine is a rotary engine in which, basically, air is compressed by a compressor, heated in a combustion chamber to such a state that its stored energy (relative to surrounding conditions) is more than that required by the compressor, and expanded through a turbine, the turbine developing sufficient power to drive at least the compressor (and any accessory equipment). During the heating process, fuel is usually added to the air, and the mixture burned in the combustion chamber. In its simplest form, the rotating compressor and turbine components are directly connected on the same shaft and excess power is directly extracted from the compressor-turbine shaft. The power output may also be extracted in the form of thrust by so designing the system components that the hot gases are only partially expanded in the turbine, the turbine developing just sufficient power to drive the compressor, with the remaining energy in the turbine exhaust gases being used to increase the velocity of those gases as they leave the system through a nozzle. The power output may also be extracted in the form of pneumatic power (compressed air) by designing the system components so that the total air flow through the compressor is significantly greater than that in the turbine, the turbine again developing just sufficient power to drive the compressor. Such a turbine system is called a bleed air system, since that pneumatic power is obtained by "bleeding" the excess, high pressure air from the compressor exit. Most gas turbine systems, either in use today or being considered for future use, are more complex than those described above so that increased performance and lower specific fuel consumptions (higher thermal efficiencies) can be obtained.

It is an object of this invention to provide a novel and improved gas turbine that may be economically constructed and is relatively easy to maintain.

Another object of the invention is to provide a novel and improve gas turbine which is efficient in operation and produces low emission or other output contaminants.

A further object of the invention is to provide a novel and improved gas turbine core engine that can be easily adapted to a variety of commercial and industrial applications.

Another object of the invention is to provide novel and improved fuel supplying mechanisms for gas turbines.

Still another object of the invention is to provide novel and improved arrangements for mounting and driving rotating elements of a gas turbine.

A further object of the invention is to provide novel and improved combustion chamber configurations particularly useful in gas turbine systems.

Another object of the invention is to provide novel and improved bearing and lubrication arrangements particularly useful in gas turbine systems.

Still another object of the invention is to provide novel and improved turbine shroud constructions and arrangements.

A further object of the invention is to provide novel and improved seal arrangements that are particularly useful in gas turbine systems and methods for constructing such seal arrangements.

Still another object of the invention is to provide a novel and improved gas turbine that has high reliability, that is has long operating life and requires minimum servicing.

A gas turbine constructed in accordance with features of the invention includes a front housing component in which is positioned a first bearing assembly and a first rotary component such as compressor, one or more intermediate housing components in which are positioned a combustion chamber and a second rotary component such as a turbine or expansion component; and a rear housing component in which is positioned a second bearing assembly, the two bearing assemblies providing the complete support of the rotating components of the gas turbine, the first bearing assembly being positioned on the side of the first rotary components remote from the combustion chamber and the second bearing assembly being positioned on the side of the second rotary component remote from the combustion chamber.

This arrangement locates the bearing assemblies at substantial distances from the combustion chamber. Temperatures at the shaft adjacent the combustion chamber run as high as 1000° F or more. In accordance with another feature, there is provided an improved seal which restricts the flow of fluids between regions of different pressure in such interstage locations. The seal is of the labyrinth type, one member of which has a plurality of spaced continuous projections, and the other member of which includes a metal support member and a porous seal member composed of sintered metal fibers of the requisite mallcability. In a transition zone between the support and seal members, the metal of the support member is disposed in the pores of the seal member such that the seal end support members are securely bonded together. A variety of techniques have been proposed for joining sintered metal fiber articles to support members such techniques including welding, soldering, brazing, and adhesive bonding. Each of these procedures have drawbacks and have been particularly difficult and expensive to apply for high temperature seals such as are used in gas turbine environments. In accordance with a further feature of the invention, the improved seal component is formed by forming the porous sintered metal fiber member in annular configuration, placing that seal member in a mold with a core member in engagement with its inner (sealing) surface and a cavity surrounding the seal member, and then pouring molten metal into the cavity surrounding the seal member, the molten metal forming the support member and flowing into the pores in the outer periphery of the seal member and providing a firm bond while leaving the pores on the inner periphery open so that the metal fiber material is displaceable as desired to provide the appropriate rub tolerant surface so that the quality of the labyrinth seal in use is not impaired or significantly degraded.

When the turbine is in operation, thermal expansion takes place which reduces the clearance between the rotatable and stationary seal components. The rotating assembly may also pass through critical vibration stages at which some interference or engagement between the seal components occurs. At such time, the relatively narrow edges of projections of the one member may forcibly engage the metal fiber surface of the seal member and displace some of the material in that layer. Since the material of the seal layer is softer than that of the projections, the deformation will occur in the seal layer and not impair the effectiveness of the seal but rather increase the tortous path between the components of the seal and thus improve its effectiveness.

In accordance with another feature, the turbine includes a shroud of material that has a low coefficient of thermal expansion. This tubular shroud defines an operating or running dimension of greater stability and thus the system can be dimensioned to provide more predictable and closer running clearances at the system operating temperature. Preferably the coefficient of thermal expansion of the shroud material is less than about $4.5 \times 10^{-6}$ inches per inch per degree Centigrade. In a particular embodiment the shroud is constructed of ceramic material and secured at one end to a support ring which is shrunk onto a flange that is integral with the ceramic shroud member. The dimensions and material of the support ring are selected so that there is no permanent deformation of the support ring (the stress does not exceed the elastic limit of the support ring material) during temperature cycling. This shroud does not perform any major support function but allows lower turbine blade tip clearance to be used and improves the dimensional stability of the operating system. Further, the shroud configuration enables reduction both of cost and of stragetic material content of the engine.

In accordance with a further feature of the invention, there is provided a combustion chamber of annular configuration which has two distinct zones, a primary zone and a diluent zone. A strong toroidal recirculation is set up by the tangential injection of compressor discharge air into the primary zone, and fuel is injected into this zone, achieving excellent mixing of fuel and air. In the dilution zone the products of combustion from the primary zone are mixed with additional amounts of compressor discharge air prior to flow to the expansion or turbine stage. In a particular embodiment and in accordance with still a further feature, the combustor chamber is fabricated of four formed sheet members and assembled in manner that does not require welding or similar fastening technique and provides an economical and efficient combustor chamber arrangement.

In accordance with still a further feature, a fuel slinger is provided which is configured to receive fuel from a stationary supply source and inject that fuel into the combustor chamber in radial sheet flof of uniformly dispersed very small size droplets. The slinger, in a particular embodiment, includes an annular distribution surface and an annular supply region into which fuel flows from the stationary supply source. A cylindrical dam or web separates the supply region from the distribution surface and passages through the web function to accelerate the fuel to the peripheral velocity of the slinger while restricting the rate of flow onto the annular distribution surface. That distribution surface is coned slightly outwardly and the fuel, as it moves outwardly along that injection surface, is formed into a thin film. The thin film of fuel as it leaves the end of the distribution surface, is accelerated radially and breaks up into small droplets which flow radially under centrifugal force into the primary zone of the combustion chamber, providing uniform and efficient injection of fuel into that zone. A further feature of the slinger in a particular embodiment is the provision of an axial vent to the rear of the slinger for control of air leakage through the slinger so that detrimental foaming of fuel is eliminated. Additionally, the outer surface of the stationary fuel supply lip is of conical configuration so that any fuel that flows to this lip drops back into the rotating slinger. A series of vanes in the hub of the slinger drive compressor discharge air to the rear of the slinger for combustor cooling purposes witout excessive pressure drop.

In accordance with still further features, the forward bearing assembly includes an arrangement whereby the turbine fuel is flowed through the front bearing for lubrication purposes and pressurized for application to the combustor zone. In a particular embodiment, the bearing is a sleeve bearing of novel configuration and radial slots are provided in the faces of the thrust collars. Fuel is introduced into the bearing surfaces and then is accelerated radially after flow through the bearing. The rear bearing assembly includes a similar sleeve bearing supporting the turbine shaft intermediate the turbine wheel and the output pinion. The turbine shaft is tubular and the compressor-gasifier turbine shaft extends through it and is supported coaxially therein by an internal bearing assembly. The coaxial arrangement of shafts includes space for an overrunning clutch to be mounted directly between the shafts adjacent the bearing assembly which may be used to prevent power turbine overspeed. This coaxial shaft arrangement also enables the gasifier turbine shaft to penetrate the output gear box for coupling to accessories and to facilitate turbine starting.

As indicated above, the power turbine shaft is supported by a single bearing assembly and the output gear is floating. The gear train includes a plurality of idler gears which engage the output gear such that the transmitted mechanical power is automatically distributed between the idlers. Each idler in turn drives an associated pinion gear which is in engagement with a common output gear. Thus the output gear also effectively is floating.

In accordance with still another feature, the external turbine housing members on either side of the exhaust duct structure are connected by a series of axially extending connector members or struts that are disposed about the periphery of one of the housing members. Each connector member extends through a vane structure disposed in the diffusion zone of the duct structure, the outer surface of the vane structure being of air fuel configuration. This configuration allows the support structure of the engine components to be directly connected without subjecting these components to the very hot exhaust gases in the exhaust casing and at the same time minimizing interference with the diffusion zone.

Gas turbines of the type disclosed herein are compact units and have been designed to provide powers in the range of 100–500 horsepower in three frame sizes in economical, efficient and versatile arrangements. Such turbines have a variety of uses including automotive, marine, and air compressor applications.

Other objects, features and advantages will be seen as the following description of a particular embodiment progresses, in conjunction with the drawings, in which.

DESCRIPTION OF PARTICULAR EMBODIMENT

Figure 1:
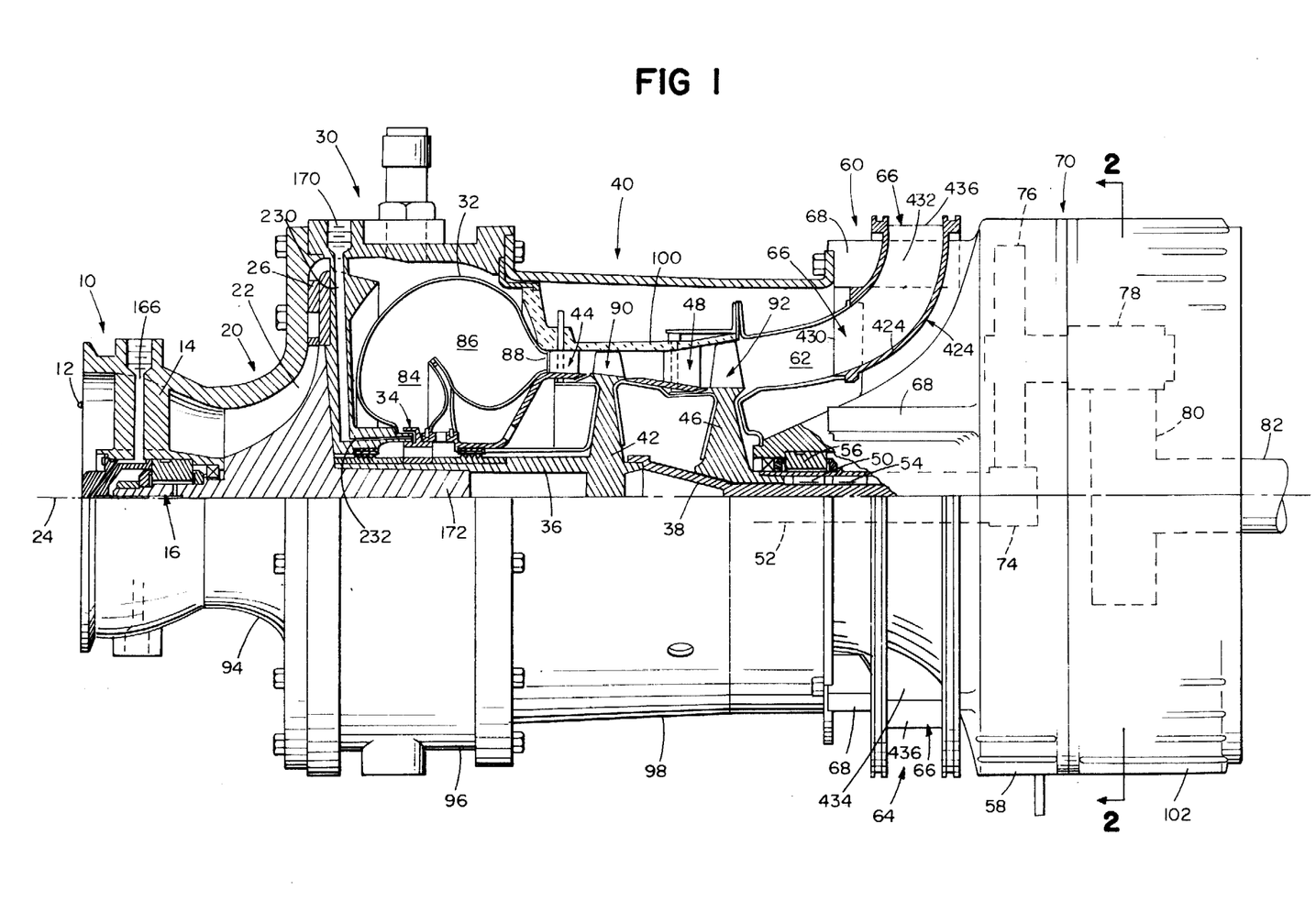
FIG. 1 is a side elevational view, partially in cross section, of a gas turbine constructed in accordance with the invention.

The gas turbine shown in FIG. 1 has an inlet stage 10 which defines an inlet opening 12 and in which are positioned three struts 14 which support a front bearing assembly 16. Following the inlet stage is a compressor stage 20 which includes an impeller 22 mounted for rotation about system axis 24, and diffuser and straightening vanes 26. A combustion stage 30 follows the compressor stage 20 and includes an annular combustion chamber 32 and a fuel slinger 34 mounted on shaft 36 which in turn is coupled to and rotates as a unit with compressor impeller 22.

The turbine or expansion stage 40 includes a gasifier turbine wheel 42 and associated gasifier nozzle structure 44 and power turbine wheel 46 and associated nozzle structure 48. Gasifier turbine shaft extension 38 extends through turbine wheel 46 and is supported by bearing 50 inside power turbine shaft extension 52. An overrunning clutch 54 is also disposed in the space between shaft extensions 38 and 52 and enables shafts 38 and 52 to be connected in driving relation to prevent overspeed 52 and in turn is supported by gear casing member 58. Coupled to the outlet of the power turbine stage is exhaust duct structure 60 which defines an annular passage 62 with a discharge port 64 at its periphery. Five hollow vanes 66 of air foil configuration are disposed in passage 62 and a coupling strut 68 extends through each vane 66.

Figure 2:
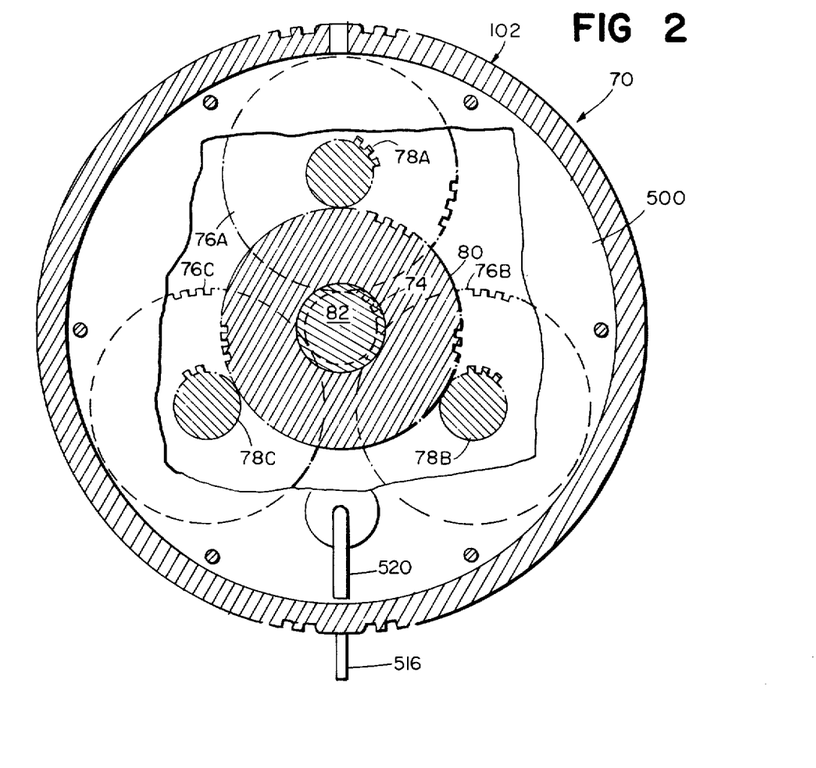
FIG. 2 is a diagrammatic sectional view of the gear box taken along the line 2—2 of FIG. 1.

As indicated in FIGS. 1 and 2, the shaft 52 of the power turbine 46 extends into gear casing 70 and includes a pinion gear 74 at its end which meshed with three idler gears 76, each of which drives a corresponding pinion gear 78. The three pinion gears 78 in turn drive output gear 80 which is mounted on output shaft 82.

Air enters the turbine engine at entrance port 12 for flow past the three radial struts 14 into compressor stage 20 and is copressed to a pressure ratio of approximately 5:1. The compressed air then flows through diffuses vanes 26 and enters combustion stage 30. Fuel is injected into the combustion chamber 32 by rotating slinger 34, combustion takes place in primary zone 84 and the resulting heated gases flow through dilution zone 86, the resulting gas temperature being in the range of approximately 1700° F at the outlet 88 of the combustion chamber. The heated gases then flow through the gasifier turbine nozzles 44 and the blades 90 of the gasifier turbine 42 to drive compressure impeller 22 and fuel slinger 34 via shaft 36. After passing from the gasifier turbine, the gases flow through the power turbine nozzle 48 and the blades 92 of the power turbine 46 to drive the power turbine shaft 52 and, via the output gears, output shaft 82. The gases from the power turbine stage flow radially outwardly through the diffusion and exhaust structure 60. In regenerative or recuperative versions of the engine, the exhaust gases may be passed through a heat exchanger before being discharged, the heat exchanger being used to heat compressor discharge air before introduction into combustor stage 30.

The compressor impeller 22 and fuel slinger 34 are mounted on and driven by the gasifier turbine through a shaft assembly that includes a forward portion supported by bearing assembly 16, and a rear shaft extension 38 which is supported by bearing assembly 50 within power turbine shaft 52 which in turn is supported by main bearing assembly 56.

The static structure of the engine consists primarily of the compressor shroud member 94 which includes structure defining the inlet port 12, combustor housing 96, turbine casing 98 in which is mounted turbine shroud 100, and gear case 70 which comprises housing members 58 and 102, struts 68 connecting casing member 58 to turbine casing 98. This static structure is designed so that exposed portions of the turbine assembly are relatively cool and provide a stiff support for the bearing assemblies located at the forward and rear ends of the compressor-turbine unit.

Figure 3:
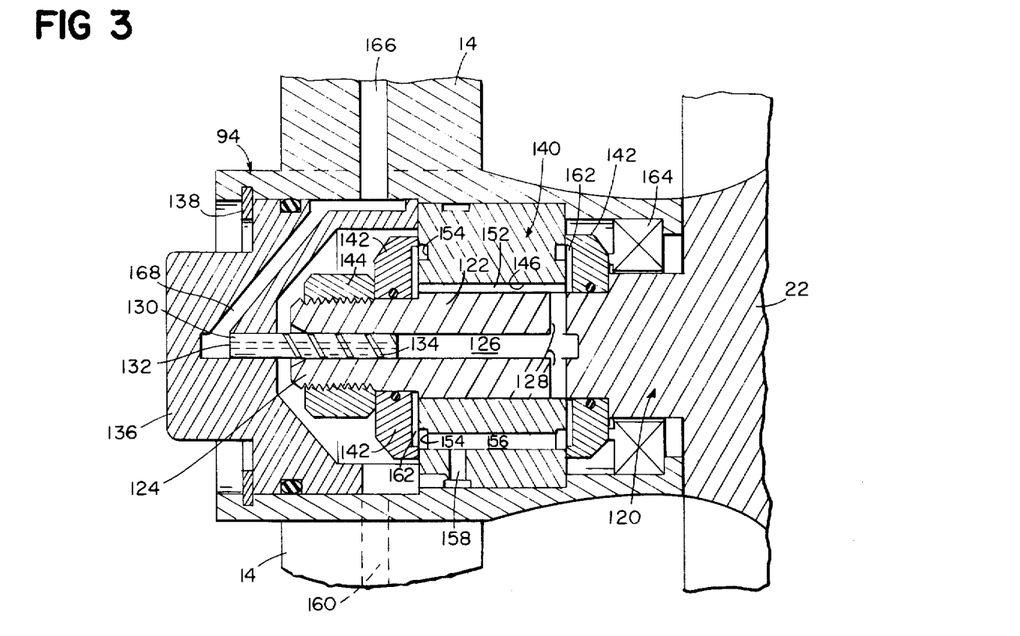
FIG. 3 is an enlarged detailed cross sectional view of the bearing assembly at the forward end of the gas turbine shown in FIG. 1.
Figure 4:
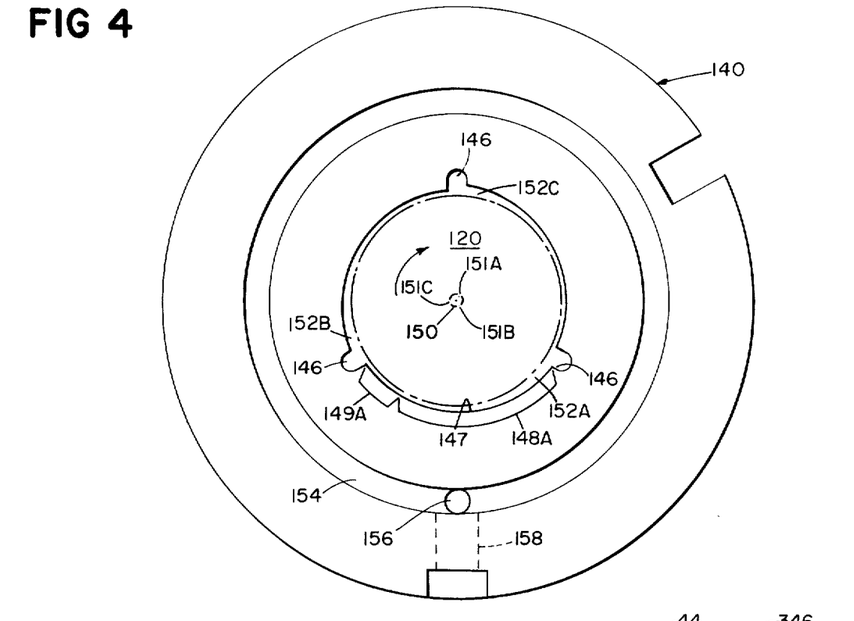
FIG. 4 is an end view of the sleeve bearing shown in FIG. 3.

Additional details of the forward shaft bearing assembly 16 may be seen with reference to FIGS. 3 and 4. The forward end of the impeller 22 has a projecting stub shaft section 120 which includes a bearing section 122 and a threaded section 124. An axial passage 126 extends into shaft section 122 and has radial ports 128. Disposed in passage 126 is tube 130 that includes axial internal passage 132 and helical groove 134 on its outer surface. Tube 130 is fixed in position in hub nose member 136 which is secured within bearing housing 16 by ring 138. Sleeve bearing assembly 140 is positioned in compressor shroud 94 on bearing seat 122 between thrust washers 142 and secured in position by nut 144 that is threaded onto the end of stub shaft 120.

As may be seen with reference to FIG. 4, the inner peripheral configuration of bearing 140 includes three axially extending slots 146 that are connected by lands 147, each of which includes an eccentric are portion 148 about 90° in extent and a concentric arc portion 149. (The center 150 of each eccentric are portion 148 lies on 0.001 inch diameter circle 151.) Shaft 120 rotates in the clockwise direction as viewed in FIG. 4 and thus three regions 152 of tapering dimension are provided which minimize "half speed whirl" imbalances. Also formed in each end face in bearing 140 is an annular recess 154 which recesses are connected by transverse passage 156. Radial passage 158 communicates with passage 160 in one strut 14 which is connected in turn to port 170 (FIG. 1). With reference to FIG. 3, each thrust washer 142 includes a series of radial slots 162 which provide radial flow passages to adjacent annular groove 154. Seal 164 has a nose which engages the surface of the thrust washer 142 to provide a seal between the bearing sump and the compressor impeller 22. A second strut 14 has an entrance passage 166 which communicates with passage 168 in hub nose 136.

Fuel is introduced through passage 166 for flow through axial passage 132 in tube 130, through shaft passage 126 and radial passages 128 outwardly into bearing regions 152 for lubrication purposes. After passing through regions 152, the fuel flows through radial slots 162 in thrust washers 142, to recesses 154 and passages 156, 158. The fuel (which has been heated and pressurized) flows out through passage 160 in a second strut for transfer to port 170 (FIG. 1) in combustor housing 92.

Figure 5:
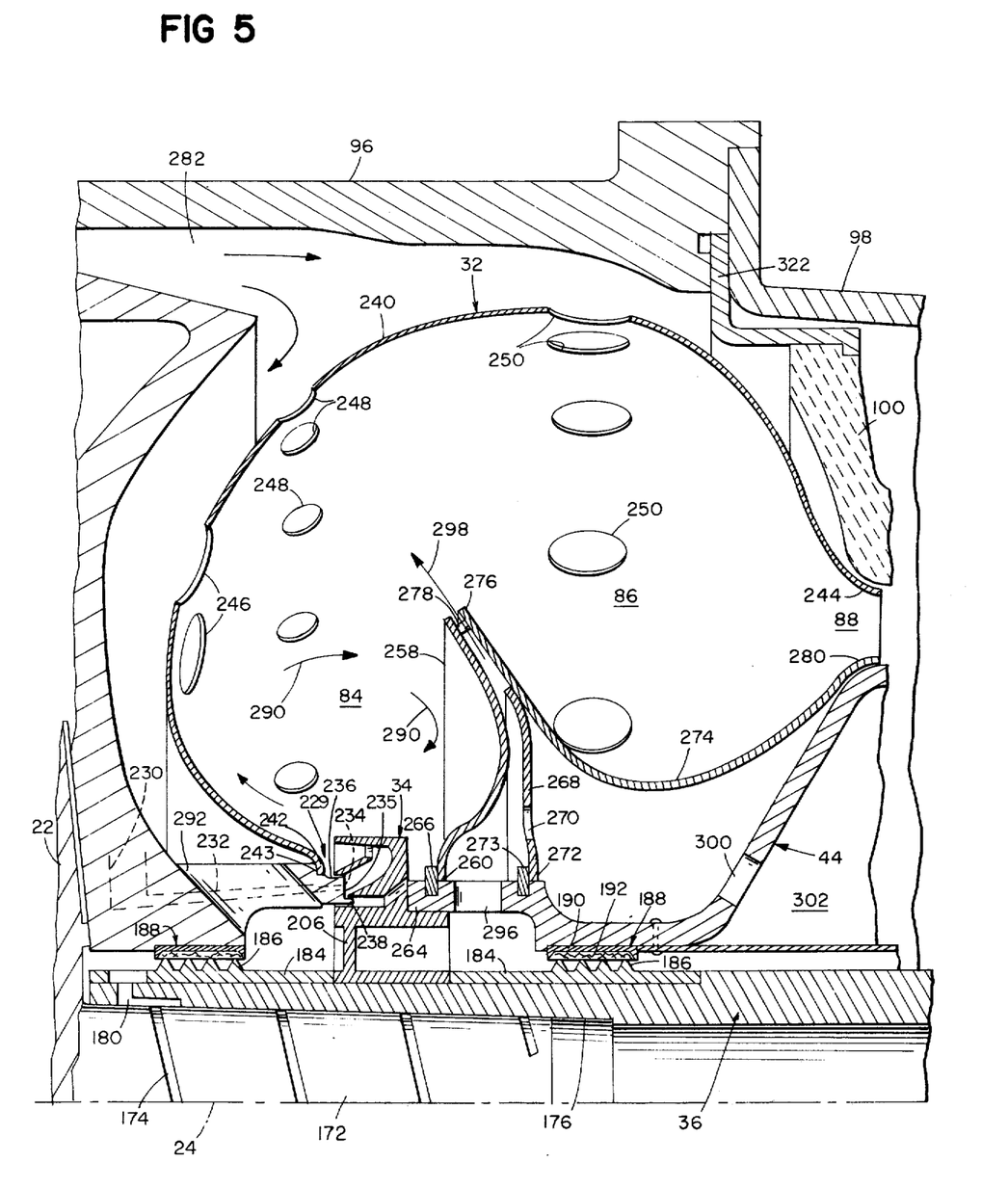
FIG. 5 is an enlarged, detailed, cross sectional view showing features of the combustion chamber incorporated in the gas turbine shown in FIG. 1.

With reference to FIG. 5, the compressor impeller 22 has a rearwardly extending stub shaft 172 in the surface of which is a helical groove 174 that has a depth of about 0.010 inch and a width of about 0.020 inch. Shaft 172 tapers about 0.005 inch over a 1 ¾ inch length, and is disposed within a bore 176 in the gasifier turbine shaft 36. Bore 176 has a diameter of 0.001 inch less than the diameter of shaft 172 and a taper of about 0.004 inch over a length of 1½ inches. The two shaft elements are hydraulically assembled by introducing oil between them. To disassemble shaft components 36 and 172, a tube is inserted into port 180 and oil under pressure in the order of 20,000 psi is introduced through the tube for flow along groove 174. This high pressure oil exerts axial force on shaft components 36 and 172 to assist the disassembly of the two shafts. This connection provides a rigid repeatable connection between the compressor and gaisifer turbine in the combustor region of the engine, and allows the bearing supports for this shaft assembly to be located at the forward and rear ends of the engine, well removed from the combustion area.

Figure 6:
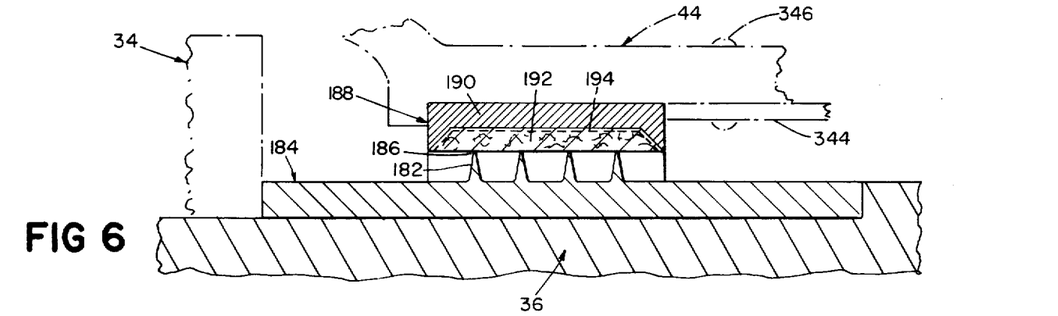
FIG. 6 is an enlarged view of one of the labyrinth seals.
Figure 7:
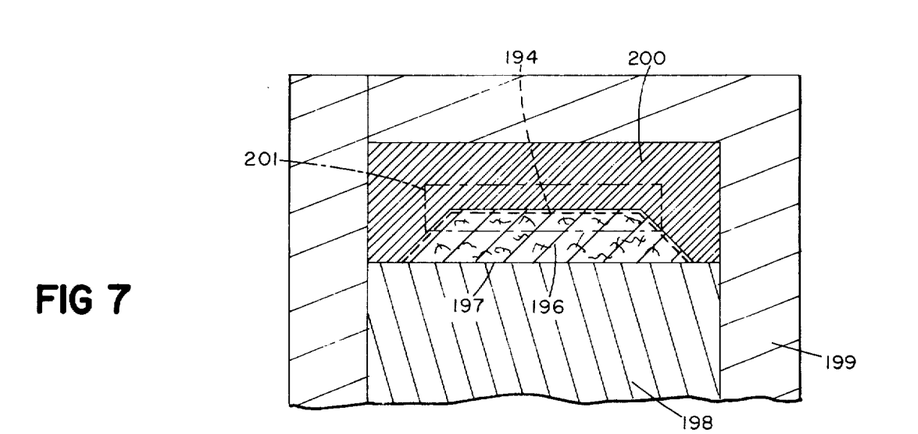
FIG. 7 is a view of one of the components of the labyrinth seals showing details of its manufacture.

Mounted on shaft 36 are two labyrinth seal members 184, each of which has four annular ridges 186. Fixed in position in engagement with each labyrinth seal member 184 is a cooperating annular seal member 188, each of which includes an annular support ring 190 of aluminum to which is secured a seal ring 192 that is composed of nickel fibers that have been sintered together to provide a porous article. Such a suitable article is made by compressing and sintering metal fibers of nickel and is sold by Huyck Metal Company under the designation Feltmetal FM1211. The pores of the seal member 192 in a transition zone 194 (FIGS. 6 & 7) are filled with aluminum bonding the seal member securely to the support ring 190.

In manufacture, a sintered metal fiber article 196, the edges of which are chamfered, is rolled into a ring. The inner surface 197 is in contact with a core 198 in a mold 199 and molten aluminum is cast to the configuration 200. The resulting member, after removal from the mold is machined to the configuration indicated by the dashed line 201 in FIG. 7 to form the seal member 188. This method provides a seal member capable of withstanding the extremely high temperatures in the gas turbine adjacent the combustor and provides shaft sealing on either side of the combustor chamber.

Figures 8, 10:
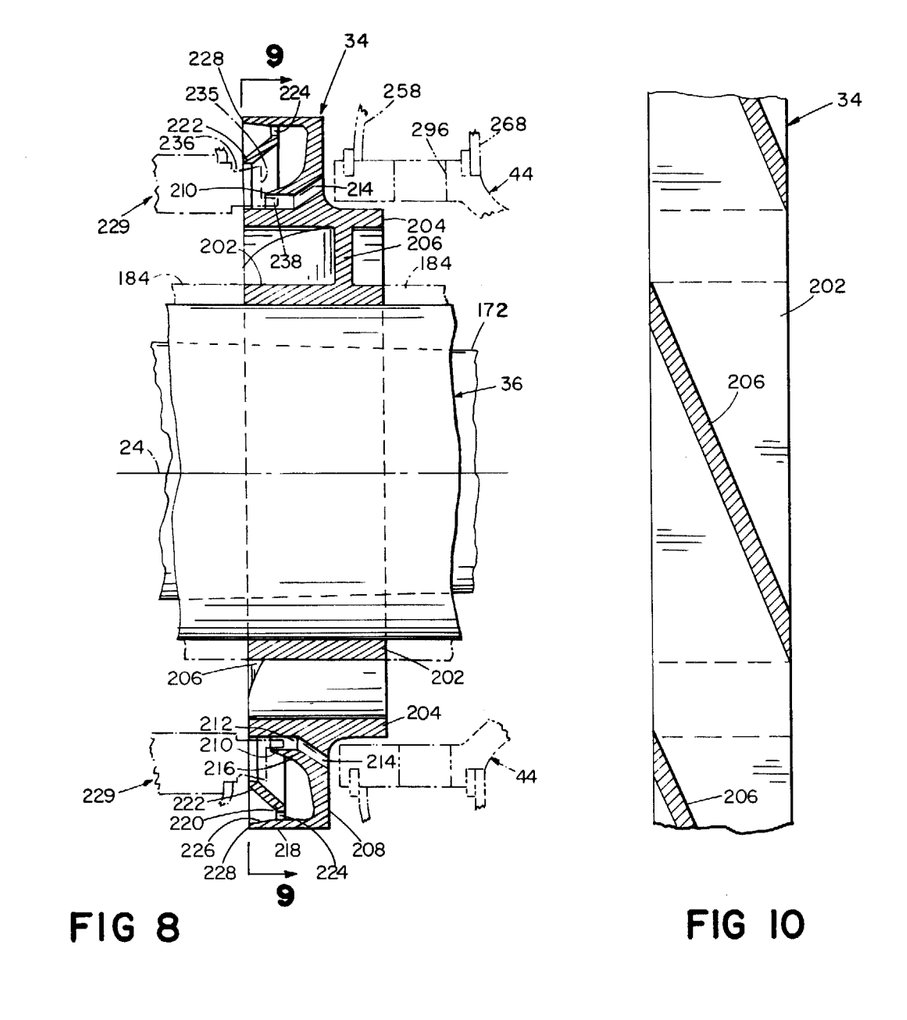
FIG. 8 is an enlarged cross sectional view of the fuel slinger employed in conjunction with the combustion chamber shown in FIG. 5.
FIG. 10 is a development view taken along the line 10—10 of FIG. 8 showing the configuration of vanes through the hub of the fuel slinger.
Figure 9:
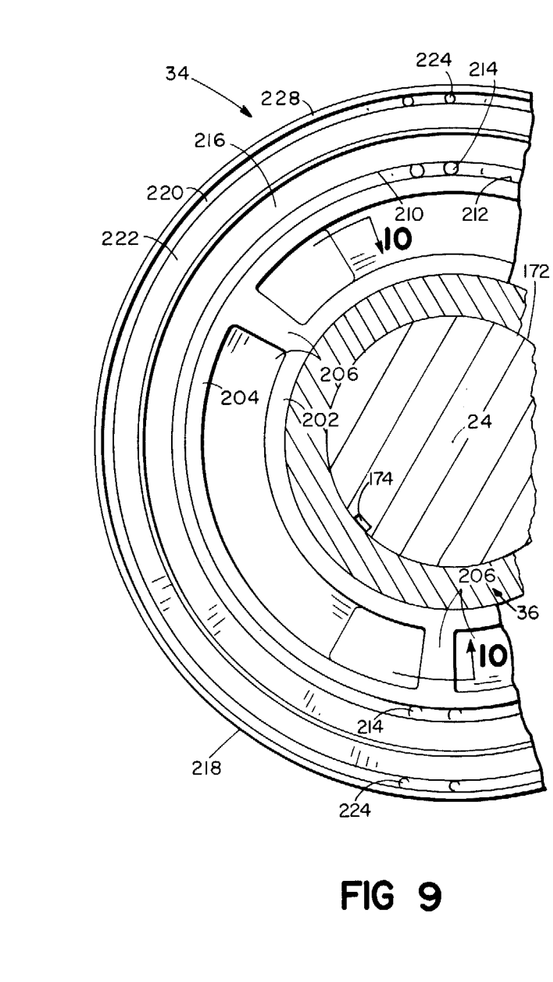
FIG. 9 is a partial elevational view taken along the line 9—9 of FIG. 8.

Mounted on gasifier turbine shaft 36 between the two labyrinth seals 184 is fuel slinger 34, additional details of which may be seen with reference to FIGS. 5 and 8–10. Slinger 34 includes an inner annular hub member 202 and an outer annular hub member 204 between which are disposed vanes 206 that are inclined at an angle of about 20° as indicated in FIG. 10, and act to force air through the hub as the shaft 36 and slinger 34 rotate. Extending radially out from outer hub 204 is a radial flange or wall 208. Projecting forwardly from wall 208 is annular inner lip member 210 which is spaced from hub 204 by annular recess 212. At the rear end of recess 212 are a series of 50 equally spaced passages 214 which extend through wall 208 and are inclined at an angle of about 35° to system axis 24. The outer surface 216 of lip 210 is a smoothly curved surface that extends to annular outer flange 218. Extending inwardly intermediate the ends of flange 218 is an annular web or dam member 220 which has an inclined lip portion 222 disposed at an angle of 35° to the axis 24. Fifty ports 224, each about 1 millimeter in length and 1 millimeter in diameter, pass through web 220. The inner surface 226 of annular flange 218 extending away from ports 224 on the side away from wall 208 has an outward taper of about one degree and function as a distribution surface along which fuel flows for discharge over radial lip 228.

Cooperating with fuel slinger 34 is stationary fuel supply supply structure 229. With reference to FIGS. 1 and 5, passage 230 extends from port 170 radially inward to passage 232 which extends generally axially at an angle of 5° to the axis 24 of shaft 36 to a port 234 in annular end surface 235. Outer surface 236 is inclined at an angle of 15° to system axis 24. Annular lip 238 extends radially inwardly of surface 235.

In assembly, as shown in FIG. 5, surface 235 is disposed adjacent lip 210 and inside lip surface 222; the outlet port 234 of passage 232 is radially outward of surface 216; inclined surface 236 lies below the end of inclined web 222; and lip 238 is disposed in recess 212 to define a labyrinth type path. Fuel under pressure flows from passage 232 onto inclined surface 216 for flow under centrifugal force up into the annular supply chamber at the intersection of wall 208 and flange 218 and from that chamber through acceleration and distribution passages 224 onto distribution surface 228 where the fuel is uniformly dispersed into a thin film. This thin film of fuel flows over the discharge lip 228 of the slinger and moves in a radially outward direction as it is broken into minute droplets which flow into annular combustion zone 84.

The combustor chamber 32 is defined by four annular combustor liner elements which may be best seen with reference to FIG. 5. All of the liner elements are made of Hasteloy X and have a nomimal stock thickness of 0.020 inch. Outer liner element 240 is a shaped member that has an inner lip 242 which is seated on surface 243 of housing 96; and an outer lip 244 which is adjacent shroud 100. Disposed in liner 240 are a series of twelve circumferentially arranged and equally spaced primary ports 246, each about ⅜ inch in diameter; a series of 24 circumferentially disposed and equally spaced secondary ports 248, each about 3/16 inch in diameter; and a third series of 24 circumferentially arranged and equally spaced dilution ports 250, each about ⅜ inch in diameter.

A second combustor liner 258 is of dished configuration as indicated in FIG. 5 and its inner periphery 260 is seated on portion 264 of the gasifier nozzle structure 44 and secured in place by snap ring 266. A third liner member 268, of less dished configuration than liner member 258, has a series of 20 equally spaced and circumferentially arranged ports 270. The inner perihery 272 of member 268 is also seated on the gasifier nozzle structure 44 and secured in place by snap ring 273. The fourth combustor liner member 274 has a forward end 276 which carries a series of 16 equally spaced rivets 278 which function as spacers to define a flow path between liners 258 and 274, and a rear end 280 which is seated on the surface of gasifier nozzle structure 44. Exit port 88 is thus defined by liners 240 and 274.

In operation, air from compressor 20 enters into the chamber defined by housing 96 through passages 282 for flow around combustor liner 240 as indicated by arrows, primary air entering through ports 246 and setting up a toroidal flow pattern as indicated by arrows 290 in the subchamber 84 defined principally by the lower inner portion of outer liner 240 and liner 258, this flow being in the clockwise direction as viewed in FIG. 5. Additional air is introduced through secondary ports 248 and is directed towards lips of liners 258 and 274 to reinforce the circulation 290 and also to cool the lips of liners 258 and 274. Dilution air enters through ports 250 to wash liner section 274 and to reduce the temperature of the exit air. In addition, air flows down towards shaft 36 and through passages 292 and the hub of slinger 34 as driven by vanes 206 for flow through ports 296 in the gasifier nozzle structure 44 and up through the passage between liner members 258 and 268 for discharge between the lips of liner members 258 and 274 as indicated by arrow 298. Air also flows through ports 270 in liner 268 and ports 300 in the gasifier nozzle structure 44 for flow into chamber 302.

The fuel flowing in a thin sheet radially outward into the toroidal circulation zone 84, is intimately mixed with the compressed air and burned uniformly, extablishing a temperature in the order of 3,000°F. After burning, the gas flows from the toroidal combustion zone 84 out into the larger dilution zone 86 where the air flow through the dilution ports 250 reduces the gas temperature to the order of 1700°F for flow through the combustor chamber outlet port 88 into the nozzle structure 44 of the gasifier turbine 42.

Figure 11:
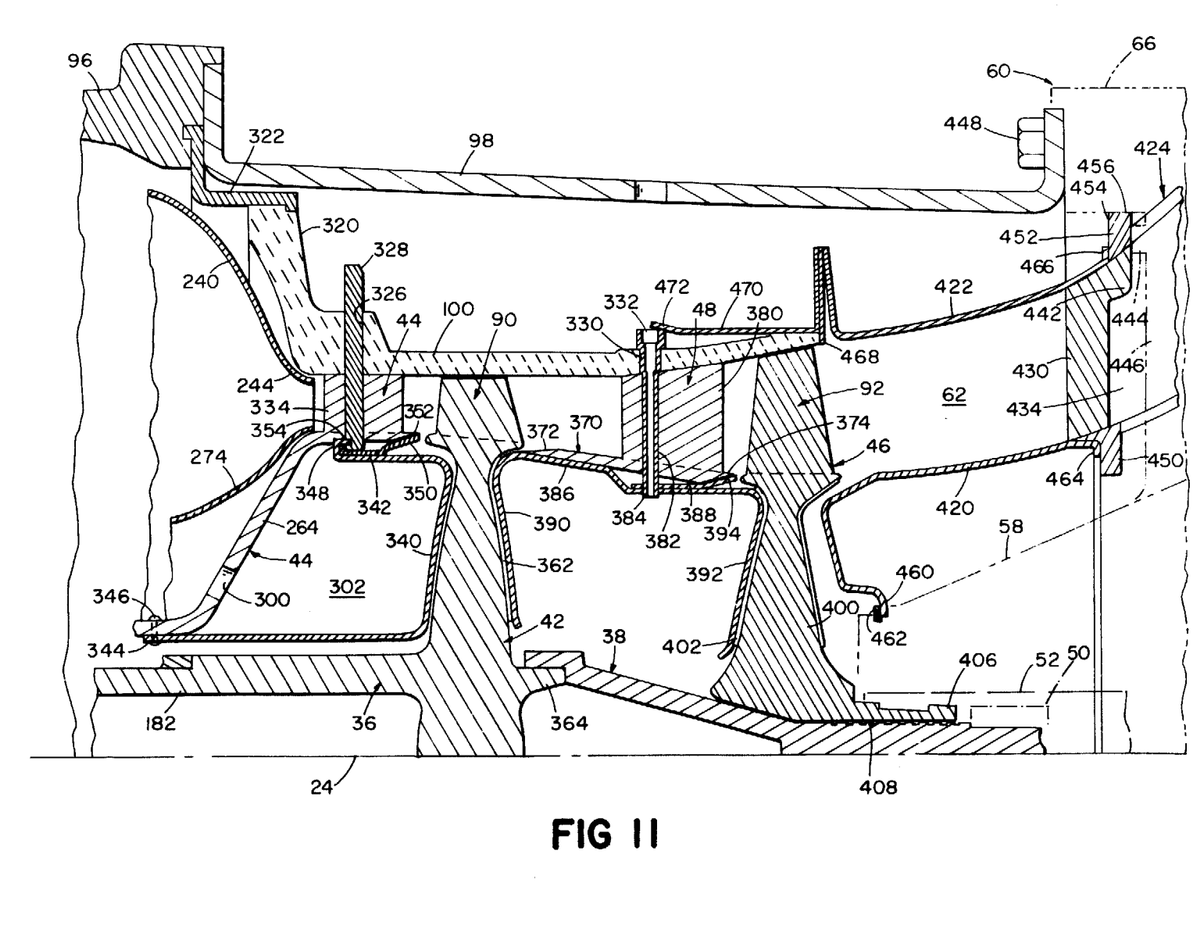
FIG. 11 is an enlarged cross sectional view showing details of the gasifier and power turbine stages incorporated in the gas turbine shown in FIG. 1.

Additional details of the gasifier turbine stage, the power turbine stage, and the exhaust duct structure may be had with reference to FIG. 11. The turbine shroud 100 is of ceramic material, e.g., silica carbide, silicon nitride, or alumina, although other materials preferably of low thermal expansion may be used, and is of generally cylindrical configuration and has end flange 320 onto which is shrunk an annular support ring bracket 322 of material thermally matched to the mounting structure and which is clamped between combustor housing 96 and turbine housing 98 to cantilever support the shroud 100 in position. Shroud 100 has a first series of 15 holes 326 equally spaced about the circumference of the shroud which receive high temperature alloy pins 328; and a second series of 25 equally spared holes 330 which receive pins 332. Each pin 328 passes through a hole in a gasifier turbine nozzle vane 334 which is integral with gasifier nozzle structure 44. Two sheet members 340, 342 are secured together in stacked relation as shown in FIG. 11 and define a diaphragm structure. The forward end 344 of sheet 340 is secured by rivets 346 to the nozzle structure 44 and has a lip 348 at its upper end. The second member 342 is seated on the upper surface of member 340 with its forward end disposed in the recess below lip 348 and its rearward end 350, which is inclined at an angle of about 15°, lies against the surface of nozzle lip 352. That surface has in it a series of 120 equally spaced slots, each about 0.004 inch deep and disposed at an angle of 50° to the axis 24. Each pin 328 has a notch 354 in its lower end which engages the lip 348 of member 340 so that the assembly of the two diaphragm members are secured together by the series of pins 328. Air in chamber 302 flows from heat chamber through the slots in lip 352 to provide cooling air for the leading edge of the turbine wheel 42.

The turbine wheel 42 has a series of 38 blades 90 equally spaced around its periphery and a series of 19 radially extending vanes 362 on the rear surface of its body. Stub 364 receives auxiliary shaft 38 which extends rearwardly through the support bearing 50 in the power turbine shaft 52.

The power turbine nozzle structure 48 includes a cylindrical base member 370 which has a tapered leading edge 372 and a tapered trailing edge 374. One hundred twenty equally spaced slots, similar to the slots in lip 352, are disposed in the inner surface of edge 374 at an angle of 25° to the system axis 24. Twenty-five nozzle blades 380 are equally spaced about and extend generally radially outward from base 370. Each nozzle blade has a passage 382 through which a hollow pin 332 extends, which pins position the nozzle structure 48 relative to shroud 100.

The lower end 384 of each pin 332 extends beneath annular base member 370 and passes through holes in midliner 386 and air guide liner 388. Each liner has a nominal thickness of 0.020 inch, liner 386 having a forward flange 390 that overlies and is closely adjacent vanes 362 on the gasifier turbine and a rear flange 392 which conforms to the configuration of the leading edge of the power turbine wheel 46. Air guide liner 388 is seated on the outer surface of midliner 386 and has an inclined portion 394 which overlies the slots on edge 374 on the nozzle base cylinder 370.

Power turbine wheel 46 includes a body 400 that has radially extending vanes 402 on its forward surface and includes 32 turbine blades 92 that extend radially outward from its periphery. Its stub shaft extension 406 overlies a spiral land 408 on the gasifier turbine shaft extension 38 but is free to rotate independently of shaft extension 38; and power turbine shaft 52 is secured to shaft extension 406.

Figure 11A:
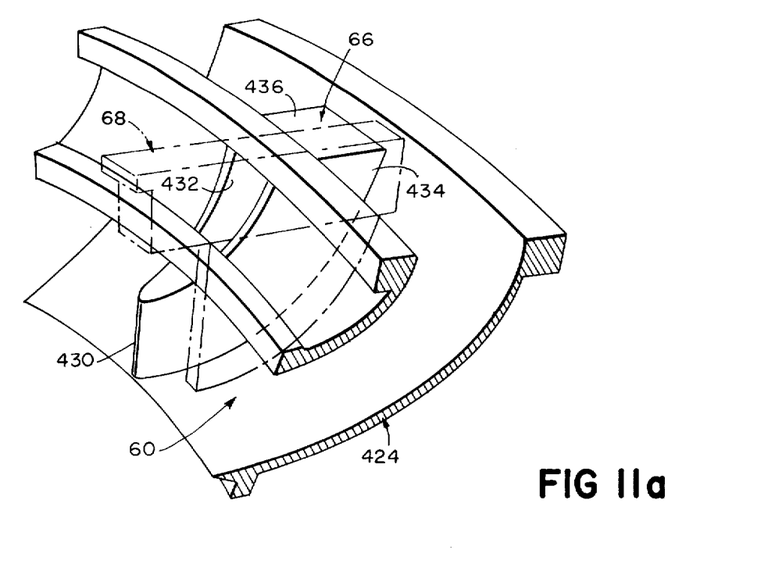
FIG. 11a is a perspective view of a portion of the exhaust duct structures.

Further details of the exhaust duct structure 60 may also be seen with reference to FIGS. 11 and 11a. That exhaust duct structure includes an annular inner member 420 and a cooperating annular outer structure 422 that together define a first or upstream portion of the annular exhaust duct passage 62. Exhaust casing 424 defines a downstream portion of the exhaust duct passage and has five hollow vane structures 66 therein. (The sectional view of FIG. 11 is through a vane structure in contrast with the sectional view of FIG. 1 which shows a vane structure in elevational view.) The nose 430 of each vane structure is of air foil configuration and each strut housing includes side wall 432 and 434 that extend downstream through duct passage 62 and a top wall 436 that connects the two side walls 432, 434. Apertures in the walls of the exhaust casing 424 between the side walls of each vane structure provide an opening through which a strut 68 passes. Formed in each vane. structure is a pad 442 against which the projection 444 of strut web 446 (FIG. 12) abuts when strut 66 is secured to housing 98 by bolt 448.

The entrance of exhaust casing 424 is defined by an inner ring 450 which extends around the inner periphery of the exhaust casing 424 and an outer ring 452 which surrounds the outer wall of the exhaust casing and has a radial surface 454 and a circumferential surface 456. The inner surfaces of struts 66 engage circumferential surface 456 for alignment purposes. Inner exhaust duct member 420 has a lip 460 at its forward end which is secured by snap ring 462 to the forward gear casing member 58; and a rear lip 464 which abuts ring 450. Outer exhaust duct structure 422 includes a rear lip 466 which abuts radial surface 454 of ring 452; an intermediate disc member 468 which abuts the end of ceramic shroud 100 and a forwardly extending flexible extension 470 that includes a lip 472 that overlies the upper ends of pins 332 and secures those pins in position. Thus struts 66 (particularly abutments 444) engage ring 452 and urge duct members 420, 422 and 424 forwardly to the position shown in FIG. 11. The vane structures of air foil configuration provide minimum disturbance of flow and expansion through the exhaust passage 62.

Figure 13:
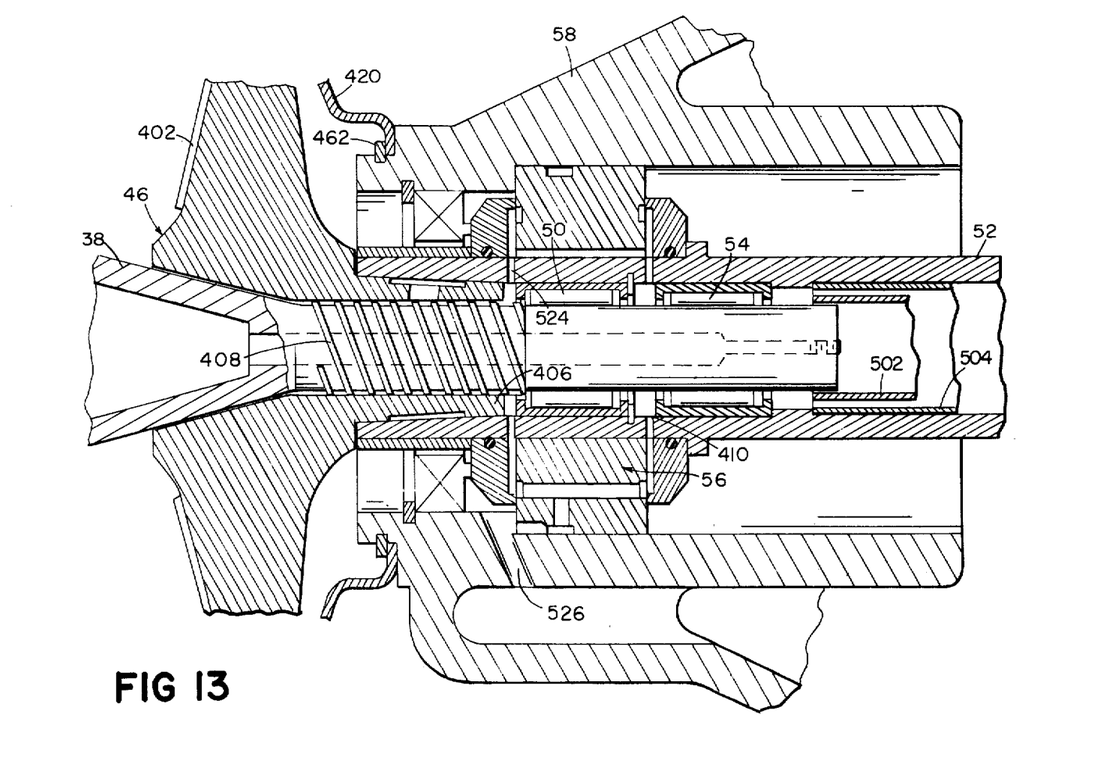
FIG. 13 is an enlarged cross sectional view showing details of the bearing assemblies at the rear end of the gas turbine shown in FIG. 1.

Additional details of the rear bearing assembly for the gasifier-compressor assembly as well as the main bearing support for the power turbine unit may be seen with reference to FIG. 13. As there indicated, the forward gear casing member 58 includes a forwardly extending portion on which the inner exhaust duct 420 is supported and into which the rear end of the gasifier turbine shaft 38 and the stub shaft 406 of the power turbine 46 extend. The gasifier turbine shaft 38 has three spiral lands 408 on it, each having four turns per inch and is supported by needle bearing unit 50. Bearing 50 is secured in axial position by pins 410 and a shoulder on shaft 38 while clutch 54 is axially positioned by a shoulder on shaft 52. Power turbine shaft 52 in turn is supported by sleeve bearing assembly 56 which is supported in casing 58 and is similar in configuration to forward bearing assembly 16.

Figure 12:
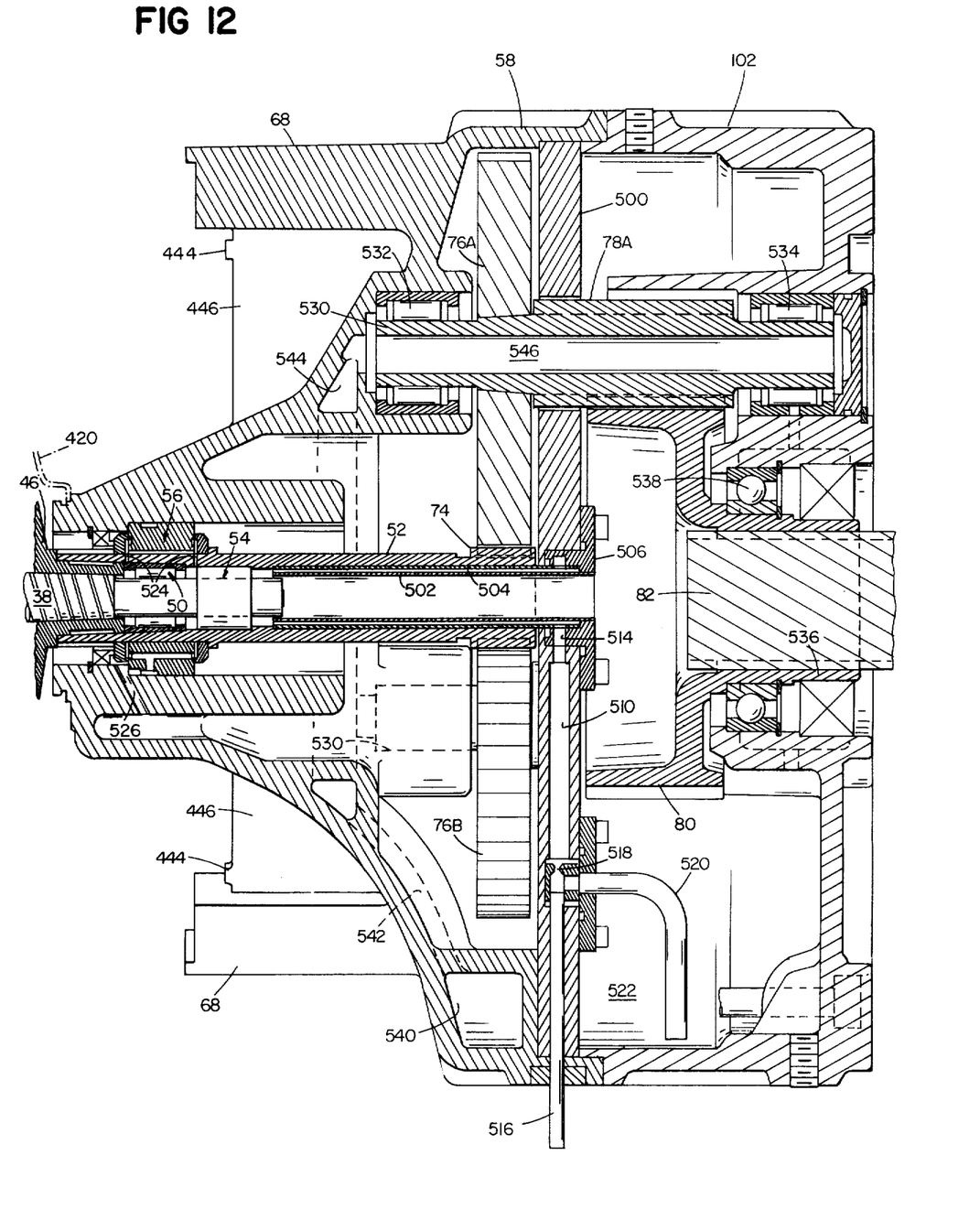
FIG. 12 is an enlarged cross sectional view showing details of the gear casing incorporated in the turbine shown in FIG. 1.

FUrther details of the output gearing arrangement and lubrication system for the rear bearing assemblies may be seen with reference to FIG. 12. As indicated above, the gear case has a forward portion 58 from which struts 68 extend and a rear portion 102. An intermediate wall 500 is positioned in between the two casing portions. An assembly of two concentric tubes 502, 504 is secured on barrier wall 500 by cap 506 and extend forwardly within the power turbine shaft 52 and terminate at the end of gasifier turbine shaft 38. A passage 510 in wall 500 communicates via port 514 with the space between tubes 502, 504. Bleed air, supplied to pipe 516, passes through nozzle 518 to aspirate lubricating oil through tube 520 from sump 522. That oil flows through passage 510 and into annular space between tubes 502 and 504 for flow under pressure through clutch 54 and bearing 50 and for further flow through ports 524 in shaft 52 into bearing assembly 56 and from there through passage 526 for return to the sump.

With reference to FIGS. 2 and 12, each of the three idler gears 76 is supported on its corresponding shaft 530 on which is integrally formed an associated pinion gear 78. Each shaft 530 is supported by bearing assemblies 532, 534 and power turbine pinion 74 is floating so that power is transmitted equally through the three idler gears 76. Output gear 80 has a tubular stub shaft 536 which receives output shaft 82 and is supported by single bearing assembly 538 so that output gear 80 effectively is also floating and automatically aligned between the three pinion gears 78. Lubrication to the six idler shaft bearing assemblies 532, 534 is provided through scoop 540 and passage 542 to annular manifold 544 which is in communication with passages 546 through each of shafts 530.

While a particular embodiment of the invention has been shown and described, various modifications thereof will be apparent to those skilled in the art and therefore it is not intended that the invention be limited to the disclosed embodiment or to details thereof and departures may be made therefrom within the spirit and scope of the invention as defined in the claims.

What is claimed is:

1. A gas turbine comprising housing structure,
a rotatable unit disposed within said housing structure, said rotatable unit including a compression component and an expansion component,
a toroidal combustion chamber disposed between said compression and expansion components, said gas turbine having a gas flow path serially through said compression component, said combustion chamber, and said expansion component, a shroud of ceramic material surrounding said expansion component, said shroud having an annular surface portion,
and support structure that has a coefficient of thermal expansion that is substantially greater than the coefficient of thermal expansion of said shroud and substantially the same as the coefficient of thermal expansion of said housing structure, said support structure including a ring portion surrounding and applying compressive force to said annular surface of said shroud, and a cantilever support portion extending axially from said ring portion and connected to said housing structure, said support structure maintaining concentricity between said shroud and said expansion component over the range of operating conditions of the gas turbine with said ring portion maintaining compressive force on said annular surface of said shroud and the change in dimensional values of said cantilever support portion corresponding to the change in dimensional values of said housing structure over said operating range.

2. A gas turbine comprising
a rotatable unit, said rotatable unit including a compression component and an expansion component,
a toroidal combustion chamber disposed between said compression and expansion components that has two distinct zones, a primary zone and a dilution zone, said combustion chamber being fabricated of a plurality of formed sheet members, comprising a main housing member in which ports are disposed for injecting discharge air from said compression component into said primary and dilution zones, second and third members cooperating to define a port for injection of compressor discharge air between said primary and dilution zones and a fourth member cooperating with said main member to define an annular port through which combustion products are discharged to said expansion component, said gas turbine having a gas flow path serially through said compression component, said combustion chamber and said expansion component, structure for injecting fuel into said primary zone, the injection of compressor discharge air into said primary zone for achieving intimate mixing of fuel and air, and the injection of compressor discharge air into said dilution zone diluting the products of combustion from said primary zone prior to flow to said expansion component, and bearing structure for supporting said rotatable unit comprising a first bearing assembly positioned on the side of said compression component remote from said combustion chamber and a second bearing assembly positioned on the side of said expansion component remote from said combustion chamber.

3. A gas turbine comprising a rotatable unit, said rotatable unit including a compression component and an expansion component, a toroidal combustion chamber disposed between said compression and expansion components that has two distinct zones, a primary zone and a dilution zone, said gas turbine having a gas flow path serially through said compression component, said combustion chamber and said expansion component, structure for injecting fuel into said primary zone comprising a fuel slinger configured to receive fuel from a stationary supply source and inject that fuel into said combustion chamber in a radial sheet of uniformly dispersed droplets, said slinger including an annular distribution surface that is coned slightly outwardly, an annular supply region into which fuel flows from the stationary supply source, and a web separating said supply region from said distribution surface, said web having passages therethrough to accelerate the fuel to the peripheral velocity of the slinger while restricting the rate of flow onto said annular distribution surface, the injection of compressor discharge air into said primary zone providing intimate mixing of fuel and air, and the injection of compressor discharge air into said dilution zone diluting the products of combustion from said primary zone prior to flow to said expansion component, and bearing structure for supporting said rotatable unit comprising a first bearing assembly positioned on the side of said compression component remote from said combustion chamber and a second bearing assembly positioned on the side of said expansion component remote from said combustion chamber.

4. A gas turbine comprising a rotatable unit, said rotatable unit including a compression component and an expansion component, a toroidal combustion chamber disposed between said compression and expansion components that has two distinct zones, a primary zone and a dilution zone, said gas turbine having a gas flow path serially through said compression component, said combustion chamber and said expansion component, structure for injecting fuel into said primary zone comprising a fuel slinger configured to receive fuel from a stationary supply source and inject that fuel into said combustion chamber in a radial sheet of uniformly dispersed droplets, said slinger including an annular distribution surface, an annular supply region into which fuel flows from the stationary supply source, an axial vent to the rear of said slinger for control of air leakage through said slinger, and a web separating said supply region from said distribution surface, said web having passages therethrough to accelerate the fuel to the peripheral velocity of the slinger while restricting the rate of flow onto said annular distribution surface, and said stationary fuel supply including a lip closely adjacent said fuel slinger to define a labyrinth path and having an outer surface of conical configuration so that any fuel that flows to said surface tends to drop back into the rotating slinger, the injection of compressor discharge air into said primary zone providing intimate mixing of fuel and air, and the injection of compressor discharge air into said dilution zone diluting the products of combustion from said primary zone prior to flow to said expansion component, and bearing structure for supporting said rotatable unit comprising a first bearing assembly positioned on the side of said compression component remote from said combustion chamber and a second bearing assembly positioned on the side of said expansion component remote from said combustion chamber.

5. The turbine as claimed in claim 4 wherein said slinger includes a hub having series of vanes therein for driving compressor discharge air to the rear of said slinger for cooling said combustion chamber.

6. A gas turbine comprising a rotatable unit, said rotatable unit including a compression component and an expansion component, a toroidal combustion chamber disposed between said compression and expansion components, said gas turbine having a gas flow path serially through said compression component, said combustion chamber and said expansion component, and bearing structure for supporting said rotatable unit comprising a first bearing assembly positioned on the side of said compression component remote from said combustion chamber and a second bearing assembly positioned on the side of said expansion component remote from said combustion chamber, said first bearing assembly includes a sleeve bearing having an inner surface spaced from the surface of the supported shaft to define a lubrication area, said lubrication area being defined by a plurality of support zones, the dimensions of each said support zone being axially uniform and each support zone including first and second angularly extending sectors, each first sector being of decreasing dimension and each second sector being of uniform dimension and of less angular extend than said first sector of that support zone, and a thrust collar on one side of said sleeve bearing, said thrust collar being secured to said supported shaft and having a plurality of radially extending passages, and means to supply fuel to said lubrication area for flow through said area to said thrust collar and subsequent pressurization due to centrifugally accelerated flow through said radially extending passages.

7. A gas turbine comprising a rotatable unit, said rotatable unit including a compression component and an expansion component, a second rotatable expansion component, an output gear, a tubular shaft connecting said second expansion component and said output gear, a toroidal combustion chamber disposed between said compression and said first expansion component, said gas turbine having a gas flow path serially through said compression component, said combustion chamber and said first and second expansion components, and bearing structure for supporting said rotatable unit and said second rotatable expansion component, said bearing structure comprising a first bearing assembly positioned on the side of said compression component remote from said combustion chamber, a second bearing assembly mounted within said tubular shaft on the side of said first and second expansion components remote from said combustion chamber, and a third bearing assembly supporting said tubular shaft between said second expansion component and said output gear so that said output gear is floating, said rotatable unit being unsupported between said compression and expansion components such that there are no bearing structures in the vicinity of said combustion chamber.

8. The turbine as claimed in claim 7 and further including an overrunning clutch disposed within said tubular shaft for directly coupling said tubular shaft and the shaft of said rotatable unit to prevent overspeed of said second expansion component.

9. The turbine as claimed in claim 7 and further including an output gear train including a plurality of idler gears in engagement with said floating output gear such that the transmitted mechanical power is automatically distributed between said idler gears, an associated pinion gear driven by each idler gear, and an output shaft having a common gear in driving engagement with all of said associated pinion gears.

10. The turbine as claimed in claim 7 wherein said expansion component is a gasifier turbine component and further including a power turbine component disposed coaxially with said rotatable unit, said power turbine component having a tubular shaft; a shaft of said rotatable unit being disposed coaxially within said tubular shaft, and an overrunning clutch disposed directly between the shaft of said rotatably unit and the tubular shaft of said power turbine component, said overrunning clutch being connected to allow said power turbine component to rotate independently of said rotatable unit when the rotational speed of said power turbine component is less than that of said rotatable unit but to couple the shaft of said rotatable unit and the tubular shaft of said power turbine component together when the rotational speed of said power turbine component equals the rotational speed of said rotatable unit to prevent the rotational speed of said power turbine component from exceeding the rotational speed of said rotatable unit.

11. The turbine as claimed in claim 12 wherein said first expansion component is a gasifier turbine component having an axially extending shaft, said second expansion component is a power turbine component and its tubular shaft extends coaxially with the shaft of said gasifier turbine component, and said overrunning clutch is disposed between the shaft of said gasifier turbine component and the shaft of said power turbine component and allows said power turbine component to rotate independently of said gasifier turbine component when the rotational speed of said power turbine component is lower than that of said gasifier turbine component, and directly couples the shaft of said gasifier turbine component and the shaft of said power turbine component together to prevent the rotational speed of said power turbine component from exceeding the rotational speed of said gasifier turbine component.

12. A gas turbine comprising a rotatable unit, said rotatable unit including a compression component and a first expansion component, a second rotatable expansion component, a toroidal combustion chamber disposed between said compression and first expansion components, said gas turbine having a gas flow path serially through said compression component, said combustion chamber, said first expansion component and said second expansion component, an output gear, tubular shaft connecting said second expansion component and said outer gear, a shaft of said rotatable unit disposed within said tubular shaft, a first bearing assembly mounted within said tubular shaft for supporting said shaft of said rotatable unit, a second bearing assembly supporting said tubular shaft between said second expansion component and said output gear, an overrunning clutch disposed with said tubular shaft for coupling said tubular shaft and said shaft of said rotatable unit to prevent overspeed of said second expansion component, and a third bearing assembly for supporting said rotatable unit said third bearing assembly being positioned on the side of said compression component remote from said combustion chamber.

13. A gas turbine comprising
a rotatable unit, said rotatable unit including a compression component, an expansion component, and output drive structure.

a toroidal combustion chamber disposed between said compression and expansion components, said gas turbine having a gas flow path serially through said compression component, said combustion chamber and said expansion component, bearing structure for supporting said rotatable unit comprising a first bearing assembly positioned on the side of said compression component remote from said combustion chamber and a second bearing assembly positioned on the side of said expansion component remote from said combustion chamber, an annular exhaust duct structure connected in series with said gas flow path, said exhaust duct structure having a diffusion zone, a plurality of hollow vane structures disposed in said diffusion zone, the outer surface of each said vane structure being of air foil configuration, a first external turbine housing member on one side of said exhaust duct structure and supporting said rotatable unit, a second external housing member on the opposite side of said exhaust duct structure and supporting said output drive structure, and a series of axially extending connector struts, each said strut extending through a corresponding hollow vane in spaced relation therefrom and structurally connecting said first and second external housing members, said hollow vanes providing thermal isolation between the hot gases in said exhaust duct structure and said connector struts.

14. A gas turbine comprising
a rotatable unit, said rotatable unit including a compression component and first and second expansion components, a toroidal combustion chamber disposed between said compression and first expansion components, annular exhaust duct structure, said gas turbine having a gas flow path serially through said compression component, said combustion chamber, said first and second expansion components, and said exhaust duct structure, said exhaust duct structure having a diffusion zone, a plurality of hollow vane structures disposed in said diffusion zone, the outer surface of each said vane structure being of air foil configuration, a first external turbine housing member on one side of said exhaust duct structure and supporting said rotatable unit, a second external housing member on the opposite side of said exhaust duct structure and supporting said output drive structure, and a series of axially extending connector struts, each said strut extending through a corresponding hollow vane in spaced relation therefrom and structurally connecting said first and second external housing members, said hollow vanes providing thermal isolation between the hot gases in said exhaust duct structure and said connector struts.

15. A gas turbine comprising a rotatable unit comprising a compression component and an expansion component, a toroidal combustion chamber disposed between said compression and expansion components, said gas turbine having a gas flow path serially through said compression component, said combustion chamber and said expansion component, and bearing structure for supporting said rotatable unit comprising a first bearing assembly positioned on the side of said compression component remote from said combustion chamber, said first bearing assembly supporting a shaft of said compression component and a second bearing assembly positioned on the side of said expansion component remote from said combustion chamber, said second bearing assembly supporting a shaft or said expansion component, one of said bearing assemblies including a sleeve bearing having an inner surface spaced from the surface of the supported turbine shaft to define a lubrication area, and a thrust collar on one side of said sleeve bearing, said thrust collar being secured to said supported shaft and having a plurality of radially extending passages in communication with said lubrication area, a fuel inlet port in communication with said lubrication area, and an outlet port in communication with said lubrication area and connected to said combustion chamber, the rotation of said thrust collar at said one bearing assembly centrifugally accelerating fuel supplied through said inlet port to said lubrication area to pump said fuel through said outlet port to said combustion chamber after said fuel has passed through the lubrication area of said one bearing assembly.

16. The turbine as claimed in claim 33 wherein said lubrication area is defined by a plurality of support zones, the dimensions of each said support zone being axially uniform and each support zone including first and second angularly extending sectors, each first sector being of decreasing dimension and each second sector being of uniform dimension and of less angular extent than said first sector of that support zone.

17. A gas turbine comprising a rotatable unit comprising a compression component and an expansion component, a toroidal combustion chamber disposed between said compression and expansion components, said gas turbine having a gas flow path serially through said compression component, said combustion chamber and said expansion component, said bearing structure supporting a shaft of said rotatable unit, said bearing structure including a sleeve bearing having an inner surface spaced from the inner surface of the supported shaft to define a lubrication area and fuel pump structure secured to said supported shaft that has a plurality of radially extending passages in communication with said lubrication area, a fuel inlet port in communication with said lubrication area, fuel supplied to said lubrication area flowing through said area to the radially extending passages of said fuel pump structure, and the rotation of said fuel pump structure centrifugally accelerating the fuel flowing through said radially extending passages to pressurize that fuel.

18. The turbine as claimed in claim 17 wherein said fuel pump structure includes a thrust collar on either side of said sleeve bearing, each said thrust collar being secured to said supported shaft and having a plurality of said radially extending passages, and fuel flows through said lubrication area to said thrust collars and subsequent pressurization due to centrifugally accelerated flow through said radially extending passages.

19. A gas turbine comprising a rotatable unit, said rotatable unit including a compression component and first and second expansion components, a shroud surrounding said expansion components, the material of said shroud having a low coefficient of thermal expansion, a toroidal combustion chamber disposed between said compression and first expansion components, said combustion chamber has two distinct zones, a primary zone and a dilution zone, said combustion chamber being fabricated of a plurality of formed sheet members, comprising a main housing member, second and third members cooperating to define a port for injection of compressor discharge air between said primary and dilution zone and a fourth member cooperating with said main member to define an annular port through which combustion products are discharged to said expansion component, ports in said main housing member for injecting discharge air from said compression component into said primary and dilution zones, structure for injecting fuel into said primary zone, said fuel injecting structure comprising a fuel slinger configured to receive fuel from a stationary supply source and inject that fuel into said combustion chamber in a radial sheet of uniformly dispersed droplets, said slinger including an annular distribution surface, an annular supply region into which fuel flows from the stationary supply source, and a web separating said supply region from said distribution surface, said web having passages therethrough to accelerate the fuel to the peripheral velocity of the slinger while restricting the rate of flow onto said annular distribution surface, the injection of compressor discharge air into said primary zone setting up a toroidal recirculation pattern in said primary zone for achieving intimate mixing of fuel and air, and the injection of compressor discharge air into said dilution zone diluting the products of combustion from said primary zone prior to flow to said expansion component, and annular exhaust duct structure, said gas turbine having a gas flow path serially through said compression component, said combustion chamber, said first and second expansion components and said exhaust duct structure, said exhaust duct structure having a diffusion zone, a plurality of vane structures disposed in said diffusion zone, the outer surface of each said vane structure being of air foil configuration, an external turbine housing member on either side of said exhaust duct structure and a series of axially extending connector struts, each strut extending through a corresponding vane and connecting said housing members.

20. The turbine as claimed in claim 19 wherein said slinger includes a hub having series of vanes therein for driving compressor discharge air to the rear of said slinger for cooling said combustion chamber, and an axial vent to the rear of said slinger for control of air leakage through said slinger, said stationary fuel supply includes a lip closely adjacent said fuel slinger to define a labyrinth path and an outer surface of conical configuration so that any fuel that flows to said surface tends to drop back into the rotating slinger, and said distribution surface is coned slightly outwardly.

21. The turbine as claimed in claim 19 and futher including a front bearing assembly for supporting a shaft of said compression component, said front bearing assembly including a sleeve bearing having an inner surface spaced from the surface of said supported shaft to define a lubrication area and a thrust collar on either side of said sleeve bearing, each said thrust collar being secured to said supported shaft and having a plurality of radially extending passages, and means to supply fuel to said lubrication area for flow through said area to said thrust collars, pressurization due to centrifugally accelerated flow through said radially extending passages, and flow to said fuel slinger.

22. The turbine as claimed in claim 21 wherein said lubrication area is defined by a plurality of support zones, the dimensions of each said support zone being axially uniform and each support zone including first and second angularly extending sectors, each first sector being of decreasing dimension and each second sector being of uniform dimension and of less angular extent then said first section of that support zone.

23. The turbine as claimed in claim 21 and further including a second expansion component, an output gear, a tubular shaft connecting said second expansion component and said output gear, a first rear bearing assembly mounted within said tubular shaft for supporting the shaft of said first expansion component, and a second rear bearing assembly supporting said tubular shaft between said second expansion component and said output gear so that said output gear is floating.

24. The turbine as claimed in claim 23 and further including an overrunning clutch disposed within said tubular shaft for directly coupling said tubular shaft and the shaft of said rotatable unit to prevent overspeed of said second expansion component.

25. The turbine as claimed in claim 23 and further including an output gear train including a plurality of idler gears in engagement with said floating output gear such that the transmitted mechanical power is automatically distributed between said idler gears, an associated pinion gear driven by each idler gear, and an output shaft having a common gear in driving engagement with all of said associated pinion gears.

* * * * *